United States Patent
Stamps et al.

(10) Patent No.: US 8,231,346 B2
(45) Date of Patent: Jul. 31, 2012

(54) CF BEARING WITH STEADY PITCHING MOMENT

(75) Inventors: Frank B. Stamps, Colleyville, TX (US); Richard Rauber, Arlington, TX (US)

(73) Assignee: Bell Helicopter Textron Inc., Forth Worth, TX (US)

( * ) Notice: Subject to any disclaimer, the term of this patent is extended or adjusted under 35 U.S.C. 154(b) by 903 days.

(21) Appl. No.: 12/303,973

(22) PCT Filed: Jun. 20, 2006

(86) PCT No.: PCT/US2006/023895
§ 371 (c)(1),
(2), (4) Date: Dec. 9, 2008

(87) PCT Pub. No.: WO2008/048206
PCT Pub. Date: Apr. 24, 2008

(65) Prior Publication Data
US 2010/0230529 A1 Sep. 16, 2010

(51) Int. Cl.
*B63H 1/00* (2006.01)
(52) U.S. Cl. ...... 416/83; 416/134 A; 416/98; 416/134 R
(58) Field of Classification Search ............ 416/83, 416/98, 134 R, 134 A
See application file for complete search history.

(56) References Cited

U.S. PATENT DOCUMENTS

| | | | | |
|---|---|---|---|---|
| 3,292,712 A * | 12/1966 | Schmidt | ............... | 416/239 |
| 3,759,631 A * | 9/1973 | Rybicki | ............... | 416/134 R |
| 4,251,187 A | 2/1981 | Hollrock | | |
| 4,365,936 A * | 12/1982 | Hatch | ............... | 416/134 A |
| 5,042,967 A * | 8/1991 | Desjardins | ............... | 416/134 A |
| 5,135,357 A * | 8/1992 | Pancotti | ............... | 416/131 |
| 5,913,659 A * | 6/1999 | Doolin et al. | ............... | 416/107 |
| 6,666,648 B2 | 12/2003 | Bernhard et al. | | |
| 6,695,583 B2 | 2/2004 | Schmaling et al. | | |

OTHER PUBLICATIONS

First Office Action from CN counterpart Application No. 200680055062.6, issued by the Patent Office of China on Nov. 15, 2010.
Office Action dated Apr. 22, 2011 from counterpart Chinese Application No. 200680055062.6.
Office Action dated Feb. 25, 2011 from counterpart Canadian Application No. 2,662,744.
Office Action from CN counterpart Application No. 200680055062.6, issued by the Patent Office of China on Aug. 2, 2011.

* cited by examiner

*Primary Examiner* — Igor Kershteyn
(74) *Attorney, Agent, or Firm* — James E. Walton; Richard G. Eldredge

(57) ABSTRACT

A centrifugal force bearing having a means for providing a steady pitching moment is disclosed. The centrifugal force bearing may optionally comprise a coning means. A rotor system having the centrifugal force bearing is disclosed. A rotary-wing aircraft having the centrifugal force bearing is disclosed.

23 Claims, 5 Drawing Sheets

CF BEARING WITH STEADY PITCHING MOMENT

TECHNICAL FIELD

The present invention relates generally to the field of rotary-wing aircraft and more particularly to the field of rotor systems for rotary-wing aircraft.

DESCRIPTION OF THE PRIOR ART

Rotary-wing aircraft have been around for a very long time. Many designs of rotary-wing aircraft include a means for varying the pitch of a rotor-blade or airfoil about a pitch change axis in an effort to alter the amount of thrust generated as the blade or airfoil is rotated about a central mast. Of the rich variety of means known for varying the pitch of a blade, common componentry includes a generally vertical pitch link and a generally horizontal pitch horn.

The pitch link is usually a rod-like structure attached at one end to a control device (usually a swash-plate) and at the remaining end to the pitch horn. The pitch horn is also attached to a blade. The pitch link is attached to the pitch horn so that the pitch horn is perturbed as the pitch link is translated along a lengthwise axis of the pitch link. Perturbing the pitch horn causes rotation of the attached blade about a pitch change axis of the blade. Unfortunately, as the pitch horn rotates the blade, the pitch horn and in turn the pitch link are acted upon by an undesirable reactionary moment originating from the inherent mass/inertial properties of the blade. Most blades can be generalized as having a major inertial axis and a minor inertial axis, where the major inertial axis is associated with the directionality of the chord lengths. Typically, the blade tends to lie flat with the chord lengths generally parallel to the ground. In operation, as the pitch horn rotates the blade into a more higher angle of attack for creating thrust, the blade tends to simultaneously oppose rotation out of the initial lower angle of attack position.

As the pitch link and pitch horn are purposefully exposed to the forces necessary to rotate the blade about the pitch change axis, the pitch link and the pitch horn must also endure the resultant forces transmitted due to the unintended reactionary moment. Since these forces are known to rotary-wing aircraft designers, the pitch links, pitch horns, and associated components must be designed to withstand at least the sum of the intended and unintended forces described above.

Usually, the pitch links, pitch horns, and associated components are simply sized, shaped, and constructed of materials capable of handling the sum of the forces anticipated. To accommodate for the unintended reactionary moment transmitted by the blade, the pitch links, pitch horns, and associated components are necessarily larger, heavier, inconveniently shaped, and/or constructed of more expensive materials than would otherwise be necessary if the components did not have to endure exposure to the unintended reactionary moment.

Further, without additional hardware, the unintended reactionary moments caused by multiple blades is usually transmitted through a control system all the way to the pilot input devices. The reactionary moments are experienced by the pilot as additional resistance when the pilot attempts to issue an increase in thrust by pitching the blades. The resistive forces often experienced by the pilot are significant and have led to the incorporation of hydraulic compensators within the control system in an attempt to negate the pilot's perception of the sum of the multiple unintended reactionary moments. Similar to the discussion above, adding hydraulic systems capable of compensating for the full amount of the unintended reactionary moments undesirably adds weight, cost, and packaging complications to the overall control-system design.

Finally, some higher performance airfoils tend to have higher undesirable reactionary pitching moments. Using the higher performance airfoils is and will continue to be rendered less attractive until the negative impacts of the higher undesirable reactionary pitching moments are beneficially addressed and resolved.

While the blade pitch change mechanisms described above represent significant developments in rotary-wing aircraft, considerable shortcomings remain.

SUMMARY OF THE INVENTION

There is a need for a centrifugal force bearing which provides a constant pitching moment.

Therefore, it is an object of the present invention to provide a centrifugal force bearing which provides a constant pitching moment.

This object is achieved by providing a centrifugal force bearing having a pitching moment means for providing a constant pitching moment.

The present invention provides significant advantages, including: (1) providing a low-cost and low-weight means for reducing the undesirable reactionary pitching moments of blades, (2) reducing transmission of undesirable forces to pilot input devices, and (3) enabling use of higher-performance airfoils without necessitating significantly increased strength control-system components.

Additional objectives, features, and advantages will be apparent in the written description that follows.

BRIEF DESCRIPTION OF THE DRAWINGS

The novel features believed characteristic of the invention are set forth in the appended claims. However, the invention itself, as well as, a preferred mode of use, and further objectives and advantages thereof, will best be understood by reference to the following detailed description when read in conjunction with the accompanying drawings, wherein:

DESCRIPTION OF THE PREFERRED EMBODIMENT

The present invention represents the discovery that a centrifugal force bearing (hereinafter referred to as CF bearing) for a rotary-wing aircraft rotor hub pitch change mechanism can be adapted to advantageously affect the impact of undesirable pitching moments. While specific reference is made to using the present invention with tiltrotor rotary-wing aircraft, the present invention may alternatively be used with any other rotary-wing vehicle/craft.

Figure 1:
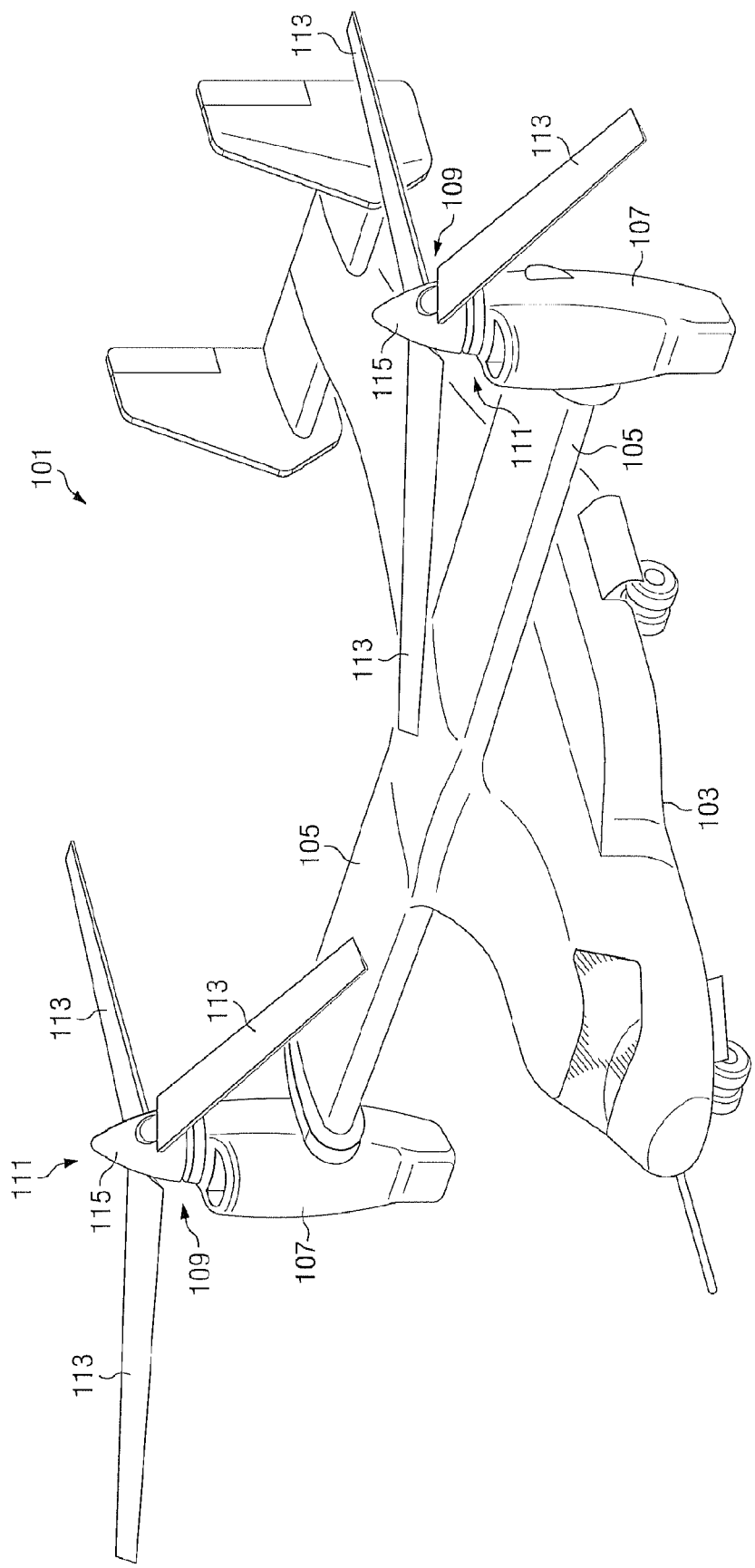
FIG. 1 is an oblique view of a tiltrotor aircraft having a centrifugal force bearing according to the present invention.

FIG. 1 depicts a tiltrotor rotary-wing aircraft incorporating the CF bearing of the present invention. FIG. 1 illustrates a tiltrotor aircraft 101 in a helicopter mode of flight operation. Aircraft 101 comprises a fuselage 103 with attached wings 105. Nacelles 107 are generally carried at the outboard ends of wings 105. Nacelles 107 are generally rotatable between the helicopter mode position shown and a forward facing airplane mode position (not shown). Nacelles 107 carry engines and transmissions for powering rotor systems 109 in rotation. Each rotor system 109 comprises a rotor hub pitch change mechanism 111 for selectively rotating rotor-blades 113 about their respective pitch change axes (not shown). Each rotor system 109 is illustrated as having three blades 113. Spinning covers 115 and nacelles 107 substantially enclose rotor hub pitch change mechanisms 111, obscuring rotor hub pitch change mechanisms 111 from view in FIG. 1.

Figure 2:
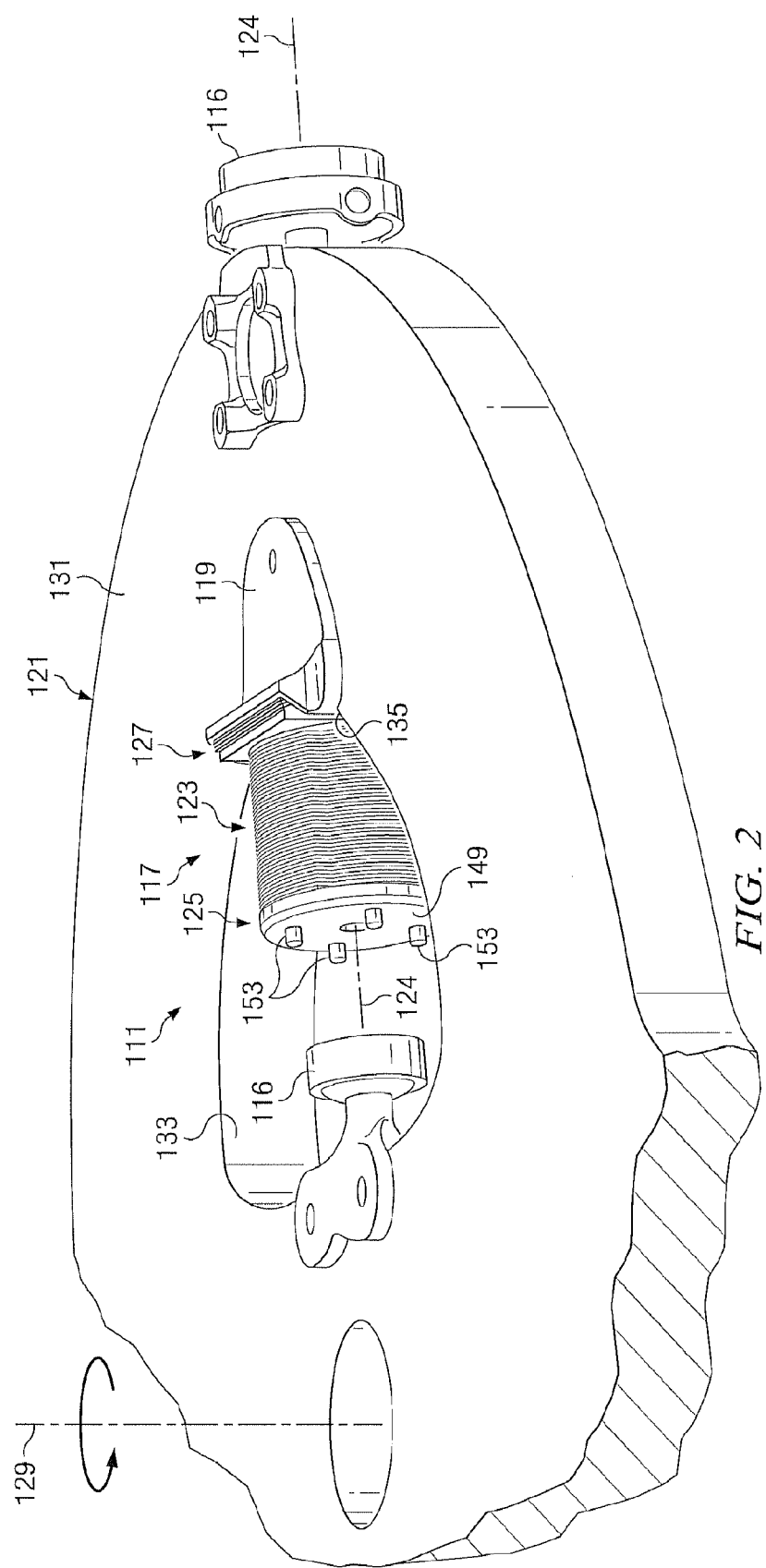
FIG. 2 is an oblique view of a portion of a rotor hub assembly, the hub assembly comprising a centrifugal force bearing according to the preferred embodiment of the present invention.

Referring now to FIG. 2 in the drawings, an oblique view of a rotor hub pitch change mechanism according to the present invention is illustrated. Rotor hub pitch change mechanism 111 generally comprises bearings interfacing the grip to a yoke for allowing relative movement between the grip and the yoke, and control linkages (not shown) for affecting movement of the grip and an attached blade 113 (not shown). Rotor hub pitch change mechanism 111 comprises inboard and outboard shear bearings 116 and a CF bearing 117. CF bearing 117 comprises a mounting means 119 for rigidly interfacing with a rotor hub yoke 121, a pitching moment means 123 for selectively causing a pitching moment about a pitch change axis 124, a grip interface means 125 for transferring forces (at least rotational and compression) forces between a grip (not shown) and CF bearing 117, and a coning means 127 for allowing small relative coning movements between the grip and yoke 121. While not shown, grips are used to connect a blade 113 to CF bearing 117.

Yoke 121 is configured for rotation about a mast axis 129. Yoke 121 generally comprises a plurality of arms 131 (only one shown), each arm 131 for connection to a blade 113. Yoke 121 also has an inboard aperture 133 (only one shown) associated with each arm 131. Inboard apertures 133 are sized and shaped so as to provide a convenient interface between yoke 121 and mounting means 119. Apertures 133 are preferably sized and shaped to have a crotch 135 located at a portion of apertures 133 located generally furthest away from mast axis 129. Crotch 135 is specifically sized and shaped to interface with mounting means 119 so as to minimize relative movement between yoke 121 and mounting means 119 when yoke 121 and CF bearing 117 are rotated about mast axis 129.

Figure 3:
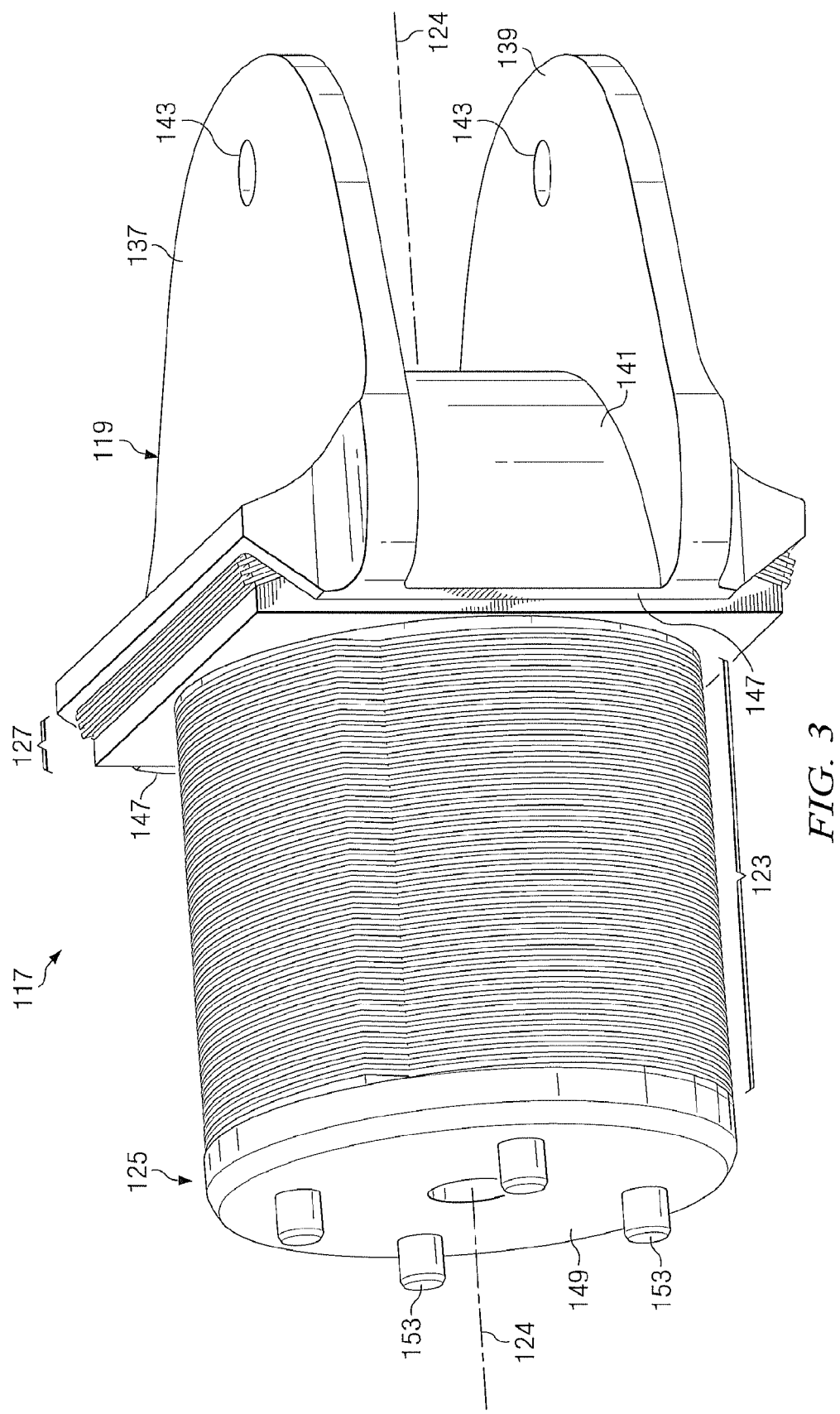
FIG. 3 is an oblique view of the centrifugal force bearing of FIG. 2 as oriented for use with a yoke.
Figure 4:
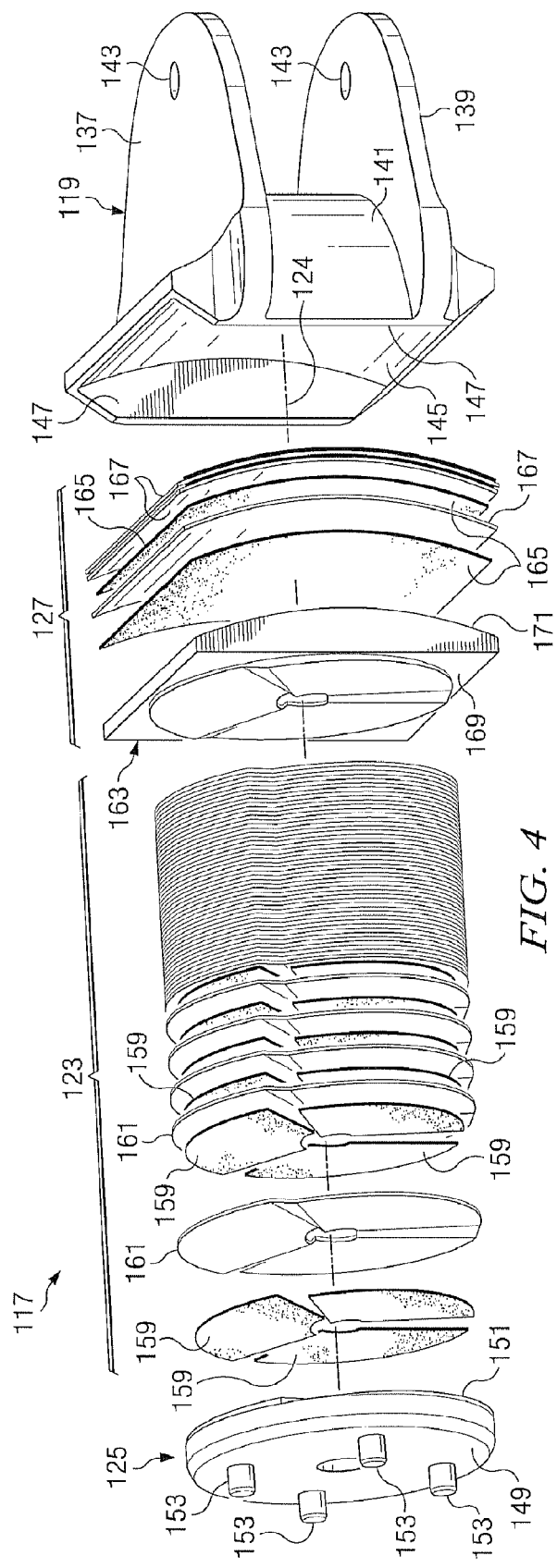
FIG. 4 is an oblique exploded view of the centrifugal force bearing of FIG. 2 oriented to show inward-facing component surfaces.
Figure 5:
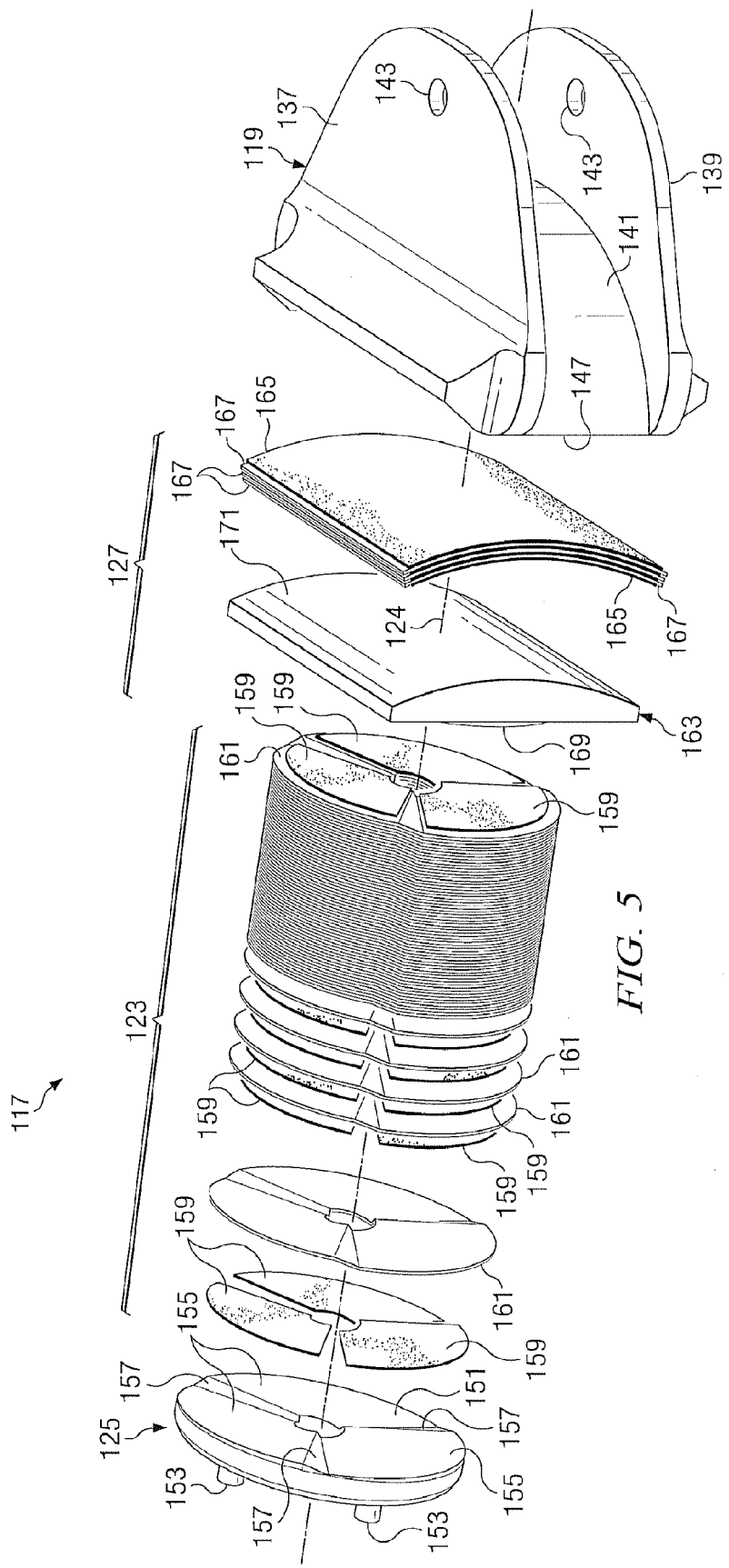
FIG. 5 is an oblique exploded view of the centrifugal force bearing of FIG. 2 oriented to show outward-facing component surfaces.

Referring now to FIGS. 3-5, the preferred embodiment of CF bearing 117 according the present invention is illustrated alone and in greater detail. Each of mounting means 119, pitching moment means 123, grip interface means 125, and coning differential means 127 are hereinafter described in detail as having particular physical characteristics; however, it will be appreciated that the scope of the present invention extends beyond the particular preferred physical embodiment.

Mounting means 119 is located further away from mast axis 129 than the remainder of CF bearing 117. Mounting means 119 comprises an upper wall 137, a lower wall 139, and an inboard wall 141. Walls 137, 139, and 141 are preferably formed of a unitary piece of steel; however, walls 137, 139, and 141 may be formed of any other material having suitable strength and may all be joined together by welding or any other appropriate means. Inboard wall 141 is configured to interface crotch 135, upper wall 137 is configured to interface a top side of yoke 121, and lower wall 139 is configured to interface a bottom side of yoke 121. Upper wall 137 and lower wall 139 each comprise a hole 143. Holes 143 are configured to accept a retaining fastener such as a bolt or pin (neither shown) for fixing mounting means 119 to yoke 121. An inboard face 145 (see FIG. 4) is configured to have a substantially cylindrical curvature, where the directionality and radius of the cylindrical curvature is such that the longitudinal axis of a coincident cylinder would intersect inboard shear bearing 116 and lie perpendicular to and coplanar with pitch change axis 124. The coincident cylinder has a radius generally equal to the distance from the intersection of inboard shear bearing 116 and pitch change axis 124 to the intersection of pitch change axis 124 and inboard face 145. Inboard face 145 is bounded at the sides by generally parallel retainer walls 147 extending generally parallel to pitch change axis 124 and toward mast axis 129.

Grip interface means 125 is located nearer mast axis 129 than the remainder of CF bearing 117. Grip interface means 125 is generally disc-shaped and comprises an inward facing wall 149 (generally facing mast axis 129) and an outward facing wall 151 (generally facing away from mast axis 129). Studs 153 protrude from inward facing wall 149 generally parallel with pitch change axis 124 and generally toward mast axis 129. Studs 153 are generally shaped as cylinders; however, studs may be shaped as any other suitable interlocking means for interfacing grip interface means 125 with a grip. A grip (not shown) comprises a structure complimentary to studs 153 for accepting studs 153. Rotational force exchanges between the grip and grip interface means 125 (about pitch change axis 124) primarily occur through the interface of studs 153 and the grip.

The same grip also comprises structure complimentary to inward facing wall 149, primarily for transferring centrifugal compression forces (along pitch change axis 124) to inward-facing wall 149. Outward-facing wall 151 comprises a plurality of helically contoured ramps 155, wherein the helical shapes have a central axis coincident with pitch change axis 124 and where the angles of inclination of the helical shapes are about 2-3 degrees; however, alternative embodiments of the CF bearing may incorporate other angles of inclination or comprise a helical axis located non-coincident with pitch change axis 124. More specifically, each ramp 155 follows a separate helical sweep about pitch change axis 124 where each helical sweep has substantially the same angle of inclination, but where the individual helical sweeps are not coincident but rather are angularly offset evenly about pitch change axis 124. Angled ledges 157 join adjacent ramps 155.

Inward facing wall 149, outward facing wall 151, studs 153, ramps 155, and ledges 157 are preferably formed of a unitary piece of steel; however, inward facing wall 149, outward facing wall 151, studs 153, ramps 155, and ledges 157 may be formed of any other material having suitable strength and may all be joined together by welding or any other appropriate means.

Generally, pitching moment means 123 and coning means 127 are sandwiched between mounting means 119 and grip interface means 125. More specifically, pitching moment means 123 is sandwiched between pitching moment means 123 and grip interface means 125, and grip interface means 125 is sandwiched between pitching moment means 123 and mounting means 119.

Pitching moment means 123 comprises a stacked arrangement of rubber inserts 159 and shims 161. Each shim 161 is a generally disc-shaped structure having an inner side 163 configured generally to compliment the contour of outward facing wall 151 (in a manner so as to allow offset mating of side 163 and wall 151) while an outer side 165 is configured generally to have the same contour as outward facing wall 151. Shims 161 are each preferably unitary thins pieces of metal but may alternatively be constructed of any other suitable material and in any other suitable manner. Rubber inserts 159 are each preferably shaped to fully cover a ramp 155. Accordingly, inserts 159 are equally well configured to fully cover the portions of shims 161 shaped similar to ramps 155. Each insert 159 is preferably a thin sheet of rubber having constant thickness. Inserts 159 are preferably formed of blended natural rubber; however, alternative embodiments may incorporate inserts formed of materials other than blended natural rubber.

Coning means 127 comprises a moment reacting plate 163 and an alternating stacked arrangement of rubber sheets 165 and curved shims 167. Moment reacting plate 163 comprises a inward facing rotation interface wall 169 and an outward facing coning interface wall 171. Rotation interface wall 169 is configured to generally compliment the contour of outward facing wall 151 to allow offset mating of wall 169 and an adjacent shim 161. Coning interface wall 171 is configured to generally compliment the contour of inboard face 145 of mounting means 119. A sheet 165 is sandwiched between wall 171 and a curved shim 167. A plurality of sheets 165 and shims 167 are stacked in an alternating arrangement such that an outermost end of the stacked arrangement comprises a rubber sheet 165 for interfacing with inboard face 145 of mounting means. Each shim 167 is preferably a thin curved piece of metal having constant thickness. Each sheet 165 is preferably a thin sheet of rubber having constant thickness. Sheets 165 are preferably formed of blended natural rubber; however, alternative embodiments may incorporate sheets formed of materials other than blended natural rubber.

As fully constructed, CF bearing 117 is a unitary structure composed of the above described components. While natural rubber inserts 159 and sheets 165 are described above as discrete pieces, they are preferably introduced into CF bearing 117 through an injection/vulcanization process whereby the metal components of CF bearing 117 are spatially arranged and rubber is injected to fill gaps between the metal components. The vulcanization process ensures that the metal and rubber components of CF bearing 117 adhere together to form a unitary structure.

In operation, CF bearing 117 is rotated together with yoke 121 about mast axis 129. Centrifugal compression forces are transferred from the grip to grip interface means 125, from grip interface means 125 to pitching moment means 123, from pitching moment means to coning means 127, from coning means 127 to mounting means 119, and finally from mounting means 119 to yoke 121. The compression forces can be very high. For example, CF bearing 117 may experience as high as 130,000 lbf during typical use on a Bell Helicopter V-22 tiltrotor aircraft. Under significant compression, rubber inserts 159 and sheets 165 become virtually frictionless in shear. Therefore, a typical centrifugal force bearing would neither impede nor aid rotation of a grip and associated blade 113 about pitch change axis.

However, CF bearing 117 is not typical. While under significant compression, adjacent shims 161 of pitching moment means 123 are compressed toward each other causing the helically inclined faces of adjacent shims 161 to interact. This interaction causes a slight rotation of each shim 161 from its non-compressed resting state and results in CF bearing 117 exerting a steady moment about pitch change axis 124.

As discussed previously, when a rotor hub pitch change mechanism such as mechanism 111 acts to rotate a blade such as blade 113 into a more aggressive or higher pitch position, an undesirable reactionary pitching moment is caused to be transferred from blade 113 to mechanism 111. The geometry and materials of CF bearing 117 are preferably tuned such that the steady moment exerted by CF bearing about pitch change axis 124 substantially combats and negates the undesirable reactionary pitching moment. While the preferred embodiment of CF bearing 117 is configured to exert a steady moment closely matched in magnitude to the value of the undesirable reactionary pitching moment, alternative embodiments of the present invention may be configured to exert a higher or lower steady moment. CF bearing 117 is configured to allow ±45 degrees or more of rotation of grip interface means 125 about pitch change axis 124 with respect to mounting means 119.

Further, as the grip and associated blade experience coning movements, those movements may be at least partially transferred from the grip to grip interface means 125, from grip interface means 125 to pitching moment means 123, and from pitching moment means to coning means 127. Coning means 127 is configured to allow at least 2-3 degrees of coning movement between plate 163 and mounting means 119. As most clearly illustrated in FIG. 3, plate 163 is prevented from traveling too much in a coning direction by retainer walls 147.

Of course, an alternative embodiment of a CF bearing according to the present invention may be substantially similar to CF bearing 117 but include no coning means. This alternative embodiment is easily configured by adapting mounting means 119 to directly interface with pitching moment means 123. Another alternative embodiment of the present invention may include both a coning means and a substantially similarly constructed lead-lag means adapted to allow small relative lead-lag movements. Of course, yet another alternative embodiment may include only a lead-lag means and no coning means.

It is apparent that an invention with significant advantages has been described and illustrated. Although the present invention is shown in a limited number of forms, it is not limited to just these forms, but is amenable to various changes and modifications without departing from the spirit thereof.

What is claimed is:

1. A centrifugal force bearing for a rotor hub, the centrifugal force bearing comprising:
   a mounting means adapted for attachment to a yoke;
   a grip interface means adapted for pitch rotation with a blade grip and for receiving centrifugal compression forces from the grip; and
   a pitching moment means connected to the mounting means and the grip interface means, the pitching moment means being configured to exert a pitching moment when the pitching moment means is compressed by the centrifugal compression forces.

2. The centrifugal force bearing according to claim 1, the pitching moment means comprising:
   a plurality of shims; and
   inserts located between adjacent shims;
   wherein the shims and the inserts cooperate to generate the pitching moment when the pitching moment means is compressed by the centrifugal compression forces.

3. The centrifugal force bearing according to claim 2, wherein the shims and the inserts are disposed along a pitch change axis, and wherein the centrifugal compression forces act along the pitch change axis.

4. The centrifugal force bearing according to claim 2, wherein at least one of the shims is configured to have at least one helically contoured ramp.

5. The centrifugal force bearing according to claim 2, wherein the inserts are constructed at least partially of an elastomeric material.

6. The centrifugal force bearing according to claim 1, further comprising: an angle differential means for allowing relative angular movement between the grip interface means and the mounting means.

7. The centrifugal force bearing according to claim 1, wherein the pitching moment is substantially constant.

8. A centrifugal force bearing for a rotor hub, the centrifugal force bearing comprising:
a first end portion adapted for rigid connection to a yoke;
a second end portion opposing the first end portion, the second end portion being adapted to pivot with a blade grip and adapted to receive centrifugal compression forces from the grip generally along a longitudinal bearing axis, and the second end portion being configured to rotate about the longitudinal bearing axis with respect to the first end portion;
a plurality of stacked shims carried between the first end portion and the second end portion; and
at least one insert carried between adjacent shims;
wherein the shims and inserts cooperate to generate a pitching moment about the longitudinal bearing axis when the centrifugal compression forces cause displacement of the second end portion toward the first end portion.

9. The centrifugal force bearing according to claim 8, the second end portion comprising:
a first side; and
studs protruding from the first side, the studs being adapted for receiving rotational force from the grip.

10. The centrifugal force bearing according to claim 8, the second end portion further comprising:
a second side; and
at least one ramp protruding from the second side, each ramp being helically inclined, and each ramp helically advancing substantially coaxial with the longitudinal bearing axis and toward the first end portion;
wherein each shim has a first shim side configured to substantially matingly conform to the shape of the second side of the second end portion, and a second shim side shaped substantially similar to the second side of the second end portion.

11. The centrifugal force bearing according to claim 8, wherein an insert separates an outermost shim from the first end portion, and an innermost side of the first end portion is configured to matingly conform to the shape of the second shim side of the outermost shim.

12. The centrifugal force bearing according to claim 8, the second end portion further comprising:
a second side; and
at least one ramp protruding from the second side, each ramp being helically inclined, and each ramp helically advancing substantially coaxial with the longitudinal bearing axis and toward the first end portion;
wherein each shim has a first shim side configured to substantially matingly conform to the shape of the second side of the second end portion, and a second shim side shaped substantially similar to the second side of the second end portion; and
wherein an insert separates an outermost shim from the first end portion, and an innermost side of the first end portion is configured to matingly conform to the shape of the second shim side of the outermost shim.

13. The centrifugal force bearing according to claim 8, wherein the inserts are constructed at least partially of an elastomeric material.

14. The centrifugal force bearing according to claim 8, further comprising:
an angular differential means for allowing relative angular movement between the first end portion and the second end portion, the angular differential means comprising:
a moment plate having an inner side and an outer side, the inner side being configured to interface with an adjacent shim, and the outer side being shaped as a cylindrical curve having a longitudinal axis, the longitudinal axis being generally tangent to a mast axis and coplanar with the longitudinal bearing axis;
a plurality of stacked cylindrically curved shims carried between the plate and the first end portion; and
at least one cylindrically curved insert carried between adjacent shims and between an outermost cylindrically curved shim and the first end portion; wherein an inward-facing side of the first end portion is cylindrically curved to facilitate the relative angular movement.

15. The centrifugal force bearing according to claim 14, the first end portion further comprising:
retainer walls bounding the inward-facing side for limiting the relative coning movement between the moment plate and the first end portion.

16. The centrifugal force bearing according to claim 14, wherein the cylindrically curved inserts are constructed at least partially of an elastomeric material.

17. A rotary-wing aircraft having at least one rotor, the rotor comprising:
a yoke;
at least two blades associated with the yoke;
at least one blade grip for connecting the blades to the yoke; and
a centrifugal force bearing, comprising:
a mounting means adapted for attachment to the yoke;
a grip interface means adapted for rotation with one of the grips and for receiving centrifugal compression forces from the grip; and
a pitching moment means connected to the mounting means and the grip interface means, the pitching moment means being configured to exert a pitching moment on the associated grip when the pitching moment means is compressed by the centrifugal compression forces.

18. The centrifugal force bearing according to claim 17, the pitching moment means comprising:
a plurality of shims; and
inserts located between adjacent shims;
wherein the shims and the inserts cooperate to generate the pitching moment when the pitching moment means is compressed by the centrifugal compression forces.

19. The centrifugal force bearing according to claim 18, wherein the shims and the inserts are disposed along a pitch change axis, and wherein the centrifugal compression forces act along the pitch change axis.

20. The centrifugal force bearing according to claim 18, wherein at least one of the shims is configured to have at least one helically contoured ramp.

21. The centrifugal force bearing according to claim 18, wherein the inserts are constructed at least partially of an elastomeric material.

22. The centrifugal force bearing according to claim 17, further comprising:
an angular differential means for allowing relative angular movement between the grip interface means and the mounting means.

23. The centrifugal force bearing according to claim 17, wherein the pitching moment is substantially constant.

* * * * *